(12) United States Patent
Clodfelter et al.

(10) Patent No.: US 6,386,380 B1
(45) Date of Patent: *May 14, 2002

(54) NECK FINISH FOR A CONTAINER AND MOLD FOR FORMING THE CONTAINER

(75) Inventors: Christopher Clodfelter; Douglas Sprick, both of Evansville, IN (US)

(73) Assignee: Rexam Medical Packaging Inc., Evansville, IN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,864

(22) Filed: Nov. 16, 1999

(51) Int. Cl.[7] .............................. B65B 7/28; B29C 49/54
(52) U.S. Cl. .................................... 215/44; 425/525
(58) Field of Search ............................ 425/525; 215/44

(56) References Cited

U.S. PATENT DOCUMENTS

| | | | |
|---|---|---|---|
| 1,499,612 A | * 7/1924 | Hammer | 215/44 |
| 1,577,020 A | * 3/1926 | Hammer | 215/44 |
| 1,841,980 A | * 1/1932 | Plattring | 215/44 |
| 1,866,770 A | 7/1932 | Hilgenberg | 215/44 |
| 2,169,686 A | * 8/1939 | Fabrice | 215/44 |
| 2,589,005 A | * 3/1952 | Welhart | 215/44 |
| 3,511,403 A | * 5/1970 | Braun | 215/44 |
| 4,007,848 A | 2/1977 | Snyder | 215/44 |
| 4,084,717 A | 4/1978 | King | 215/217 |
| 5,366,774 A | * 11/1994 | Pinto et al. | 215/44 |
| 5,423,441 A | 6/1995 | Conti | 215/44 |
| 5,431,291 A | 7/1995 | LaBombarbe, Jr. | 215/44 |
| 5,553,727 A | 9/1996 | Molinaro | 215/443 |

FOREIGN PATENT DOCUMENTS

EP        100 375 A2 *   2/1984    ................ 425/525

OTHER PUBLICATIONS

Injection Molding Handbook, Rosato et al, pp. 198 and 199 and figure 7–24, Von Nostrand Reinhold Company, Inc, 1986.*

* cited by examiner

*Primary Examiner*—Robert Davis
(74) *Attorney, Agent, or Firm*—John F. Salazar; Middleton Reutlinger

(57) ABSTRACT

A neck finish of a container which includes a helical thread encircling the neck wherein said thread is provided with a pair of recesses spaced apart 180° and in cooperative engagement with recess forming fingers in a pair of cooperating horizontally movable mold halves.

14 Claims, 3 Drawing Sheets

NECK FINISH FOR A CONTAINER AND MOLD FOR FORMING THE CONTAINER

BACKGROUND OF THE INVENTION

This invention relates to a neck finish on a container having an anti-thread distortion feature and more particularly relates to a neck finish for a container having a clearance designed into a bottle thread to allow horizontal withdrawal of bottle thread molding surfaces during manufacture.

Currently, in the forming of containers of plastic, glass, or other known materials, an extruded parison or injection molded preform is initially formed. In the use of plastics, materials such as polyethylene terephthalate (PET) or High Density Polyethylene (HDPE) are most commonly found. In the blow molding process for a container, the preform is positioned within a mold cavity which is defined by the coming together of two mold halves and the preform is held in place by the neck finish between the mold halves. In the molding process the preform is longitudinally stretched, usually by a push rod, and then laterally expanded by injection of a blowing gas or fluid into the interior of the preform. Upon completion of the molding process the mold halves are moved apart horizontally and in many instances during the separation of the mold surface, and particularly in the neck finish, the molding surfaces pull, tear, or rip the helically-shaped formed bottle container neck threads. A common problem found in the forming of containers utilizing steep-pitch threads is distortion of the threads upon removal of the container from the mold.

SUMMARY OF THE INVENTION

It is an object of the present invention to provide a neck finish for a bottle container including an anti-thread distortion feature.

It is another object of the present invention to provide a neck finish for a container which includes a clearance designed into a bottle thread to allow horizontal withdrawal of the bottle thread molding surfaces during the molding operation of a container without pulling, tearing, ripping, or otherwise deforming threads on the neck of the container.

It is yet another object of the present invention to provide a neck finish for a container which allows for the use of steep-pitch threads.

In accordance with the present invention, a blow molded container is formed from a parison. The neck finish of the container has been modified to assist in the separation of the mold upon the completion of the formation of a container without deforming the container thread profile. The neck finish is provided with a pair of recesses on opposed sides of the neck and also of the mold, each recess being disposed within a thread of the neck and in alignment with the direction of movement of the axially moveable mold sections which make up the container forming mold.

More particularly, the present invention provides a container with a neck portion having a first open end and an opposed second end opening into a body portion of the container. A helical thread of the type such as a steep-pitch helical thread or the like encircles the neck. The helical thread is provided for engagement with mating threads of a closure or container cap. A pair of recesses are provided within the helical thread wherein the recesses are spaced 180° apart. The recesses are formed by fingers in at least two axially movable mold sections. When the mold sections are joined together they form a mold cavity from which the container is formed.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
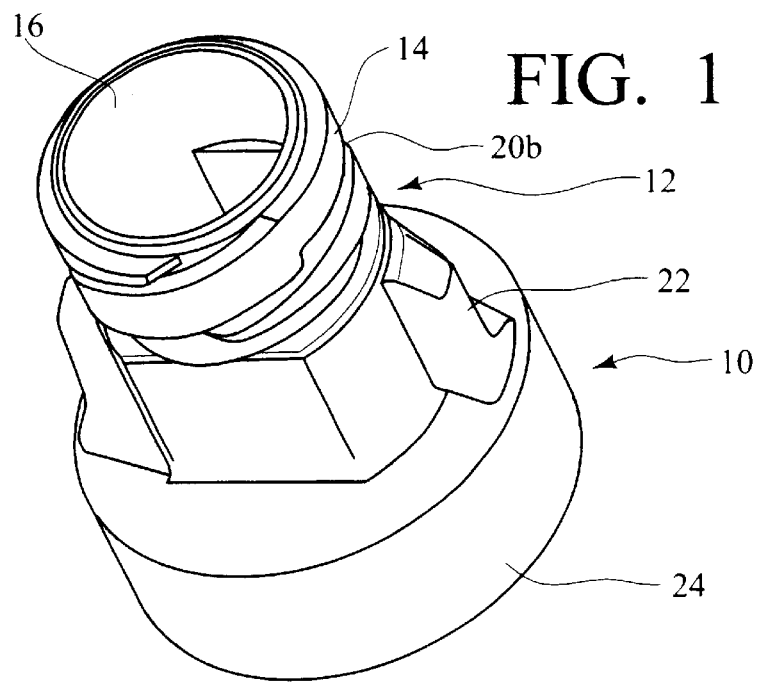
FIG. 1 is a perspective view of a neck finish of one preferred embodiment of the present invention.
Figure 2:
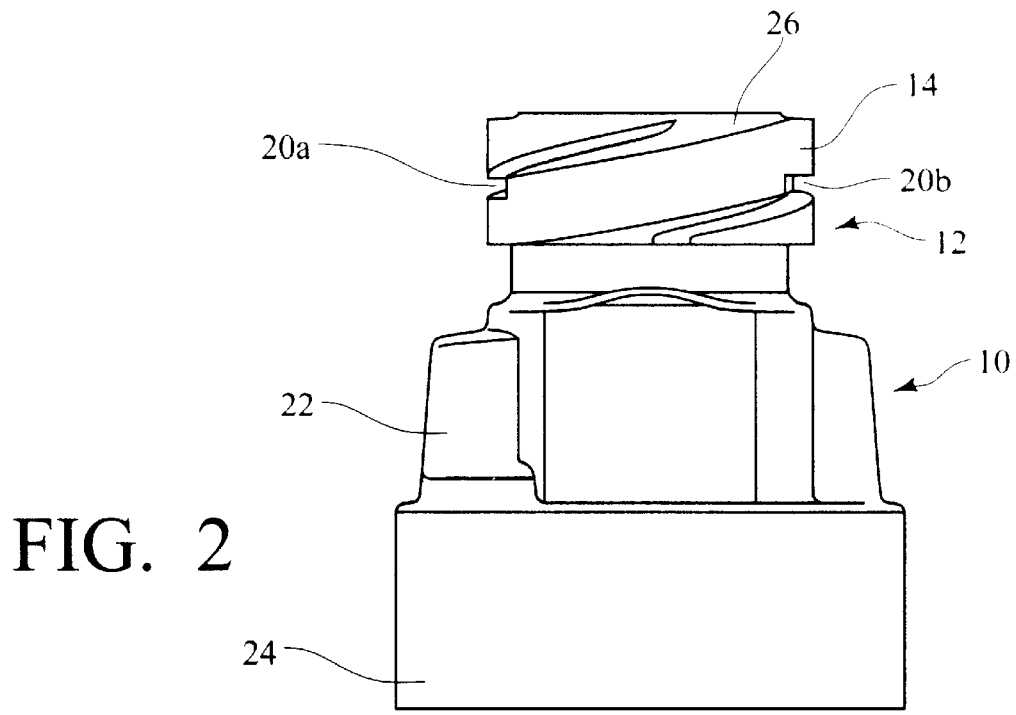
FIG. 2 is a side view of the neck finish of FIG. 1.
Figure 3:
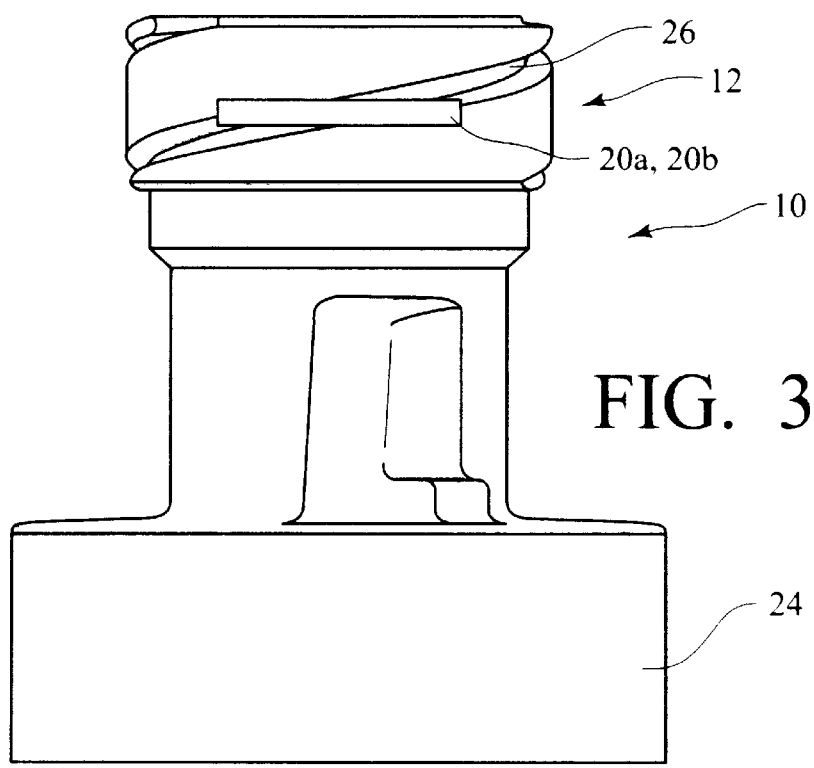
FIG. 3 is a side view of the embodiment of FIG. 1 wherein the container in FIG. 2 has been rotated 90°.
Figure 4:
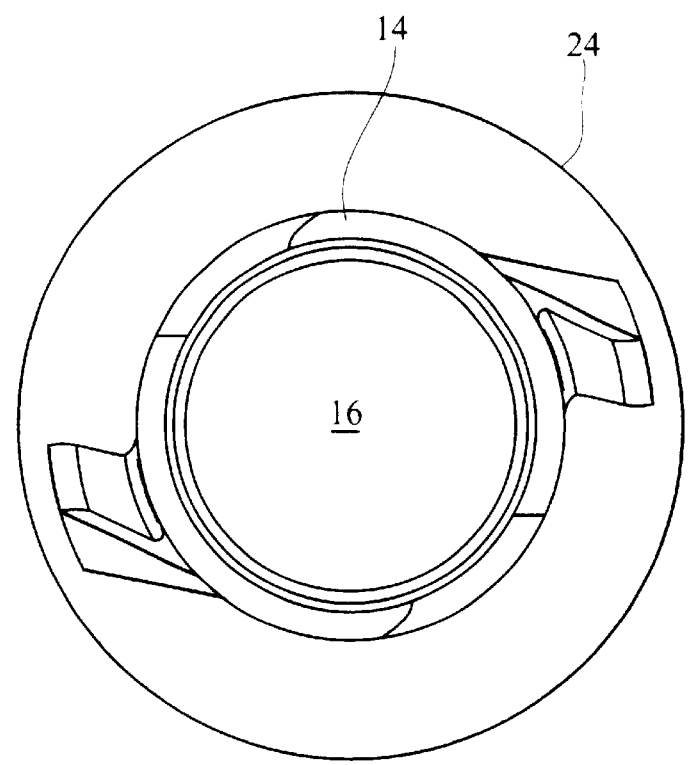
FIG. 4 is a top view of the container of FIG. 1.

As shown in FIGS. 1–4, a container 10 is made up of a neck portion 12 and a body portion 24. The neck 12 is provided with an open mouth 16 and an opposed opening into the body portion 24. Circumscribing the neck portion 12 is a helical thread 14 which is defined by a slot 26 which receives the thread of a closure or container cap (not shown). Disposed within the thread 14 is a pair of recesses 20a and 20b which are spaced from each other a total of 180°. The recesses 20a and 20b are in alignment with and formed by the fingers 32a, 32b, 32c, and 32d as shown in FIG. 5a. A latching lug 22 may also be provided for engagement with a mating latching lug on a closure (not shown).

Figure 5:
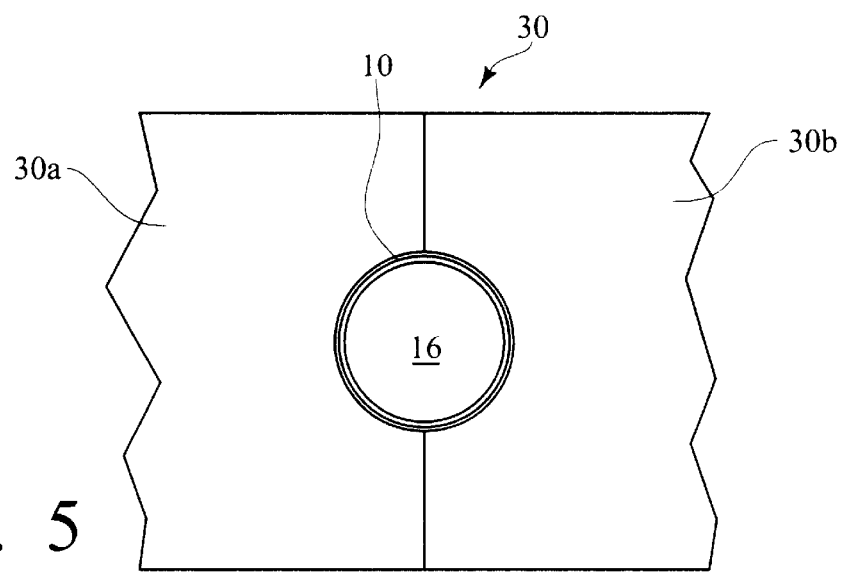
FIG. 5 is a top view of the container of FIG. 1 in a split mold.
Figure 5A:
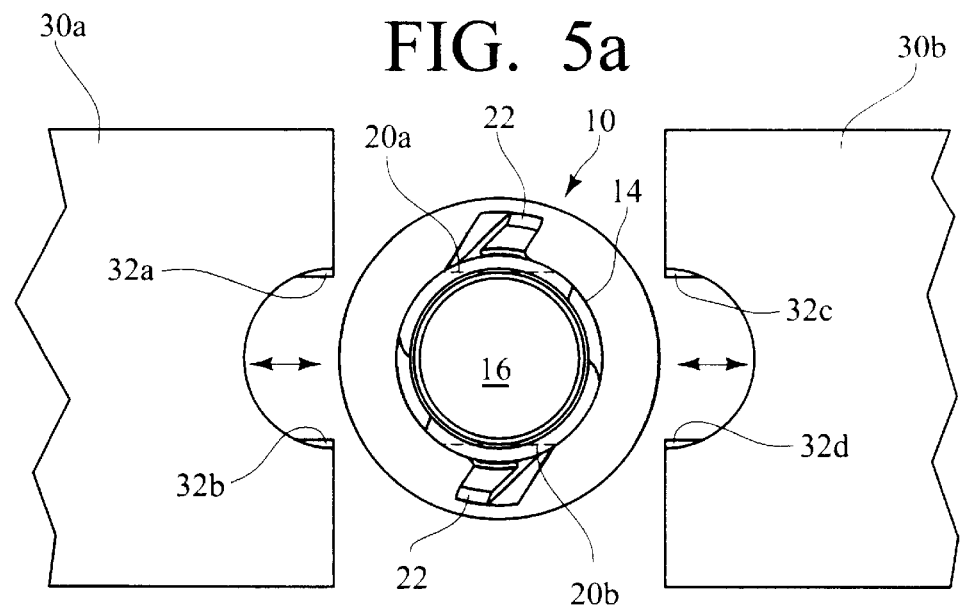
FIG. 5A is FIG. 5 with the split mold in a separated condition.

As shown in FIGS. 5 and 5a, a mold 30 of the preferred embodiment is comprised of only two sections which are, in fact, halves, One half is identifiable as 30a and the other as 30b. Molds 30a and 30b are horizontally movable by virtue of the fact that there are but two sections. When three or more sections are used, the mold sections move apart axially instead of horizontally. When the molds are in a closed position, as shown in FIG. 5, they define a cavity (not shown) for the mold of the body portion 24 of the container 10 and grasp the neck portion 12 therein and form the helical threads 14. Helical thread 14 has a pitch in the range of 0 to 8 threads per inch. As shown in FIG. 5a, the recessed portions 20a and 20b in the helical thread 14 are formed by the fingers 32a, 32b, 32c and 32d of the mold halves 30a and 30b, respectively. The horizontal recess formed by recessed portions 20a and 20b comprise a first notch disposed on a first side of the slot and a second notch disposed on a second side of the slot with the first notch juxtaposed relative to the second notch so as to horizontally traverse the slot.

In the preferred embodiment, a container 10 with a neck finish 12 of the present invention is formed by placing a parison of a selected moldable material, such as, for example polyethylene terephthalate (PET), or High Density Polyethylene (HDPE), within a cavity of the mold. The preferred embodiment also creates the mold cavity upon the bringing together of the mold halves 30a and 30b, as shown in FIG. 5. Alternate embodiments using more than two mold sections create a mold cavity when their mold sections are brought together axially. A vertically molded core (not shown) of a molding device is inserted into the cavity thereby engaging with the parison.

In a form of compression-molding, the parison is next formed into a preselected configuration defined by the spatial relationship of the core and the cavity in the mold 30 resulting in the formation of a container 10. Additionally, a blow-molding process can be used to create the container 10.

After the container 10 has been formed, the mold halves 30a and 30b are then horizontally separated as the mold halves 30a and 30b move horizontally away from the container. Furthermore, at the initial separation of the mold halves, the fingers 32a, 32b, 32c and 32d form the recesses 20a and 20b in the helical thread 14 in order to allow clearance of the mold from the neck finish and avoid distortion of the helical thread 14, even if the helical threads 14 are of a steep pitch, as the halves 30a and 30b separate.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A container formed in a mold, said container comprising:
    a neck portion having a first open end and an opposed second end opening into a body portion of said container;
    a helical thread encircling said neck and including a slot, said slot being adapted to receive a thread from a complementary closure; and
    a horizontal recess comprising a first notch disposed on a first side of said slot and a second notch disposed on a second side of said slot with said first notch being juxtaposed relative to said second notch so as to horizontally traverse said slot.

2. The container of claim 1 wherein said horizontal recesses are in cooperative engagement with fingers in at least a pair of movable mold sections.

3. The container of claim 1 wherein said container comprises a pair of horizontal recesses.

4. The container of claim 3 wherein said recesses are offset by about 180°.

5. The container of claim 1 wherein said helical thread has a pitch in the range greater than 0 to 8 threads per inch.

6. A container formed in a mold, said container comprising:
    a neck portion, having a first open end and an opposed second end, and having a helical thread including a slot encircling said neck, said slot being adapted to receive a thread from a complementary closure, said neck portion further including at least a first pair of horizontal notches wherein a first notch is disposed on a first side of said slot and a second notch is disposed on a second side of said slot with said first notch being juxtaposed relative to said second notch so as to horizontally traverse said slot; and
    a body portion formed at said opposed second end of said neck,
    wherein said container is formed in a mold comprising:
        a first horizontally movable section, said first section including a thread forming portion for forming said thread having said slot, said thread forming portion further including at least a first finger; and
        at least a second horizontally movable section, said second section being engageable with said first section so as to define a closed position which creates a cavity for forming said container, said second section further including a thread forming portion for forming said thread having said slot, said thread forming portion further including at least a first finger which can engage said first movable section first finger such that said fingers can create said first pair of horizontal notches within said thread traversing said slot.

7. The container of claim 6 wherein said helical thread has a pitch in the range of greater than 0 to 8 threads per inch.

8. The container of claim 6 wherein said neck further includes a second pair of horizontal notches within said thread traversing said slot, and said first movable section further includes a second finger and said second movable section further includes a second finger, said second fingers of said first section and said second section being engageable such that said fingers form said second pair of horizontal notches.

9. The container of claim 8 wherein said second fingers are positioned on said movable sections such that said first pair of horizontal notches is spaced from said second pair of horizontal notches by about 180°.

10. A mold for forming a container, said mold comprising:
    a first horizontally movable section, said first section including a thread forming portion for forming a thread having a slot, said thread forming portion further including at least a first finger; and
    at least a second horizontally movable section, said second section being engageable with said first section so as to define a closed position which creates a cavity for forming a container, said second section further including a thread forming portion for forming a thread having a slot, said thread forming portion further including at least a first finger which can engage said first movable section first finger such that said fingers can create a first pair of horizontal notches within said thread traversing said slot.

11. The mold of claim 10 wherein said thread forming portion has a pitch in the range of greater than 0 to 8 threads per inch.

12. The mold of claim 10 wherein said firs movable section finger engages said second movable section finger along a parting plane of said container.

13. The mold of claim 10 wherein said first movable section further includes a second finger and wherein said second movable section further includes a second finger, said second fingers of said first section and said second section being engageable such that said fingers can create a second pair of horizontal notches within said thread traversing said slot.

14. The mold of claim 13 wherein said second fingers are positioned on said movable sections such that said first pair of horizontal notches is spaced from said second pair of horizontal notches by about 180°.

* * * * *